Sept. 2, 1958
H. REHRIG
2,850,204
MILK CRATE
Filed Sept. 28, 1954
3 Sheets-Sheet 1
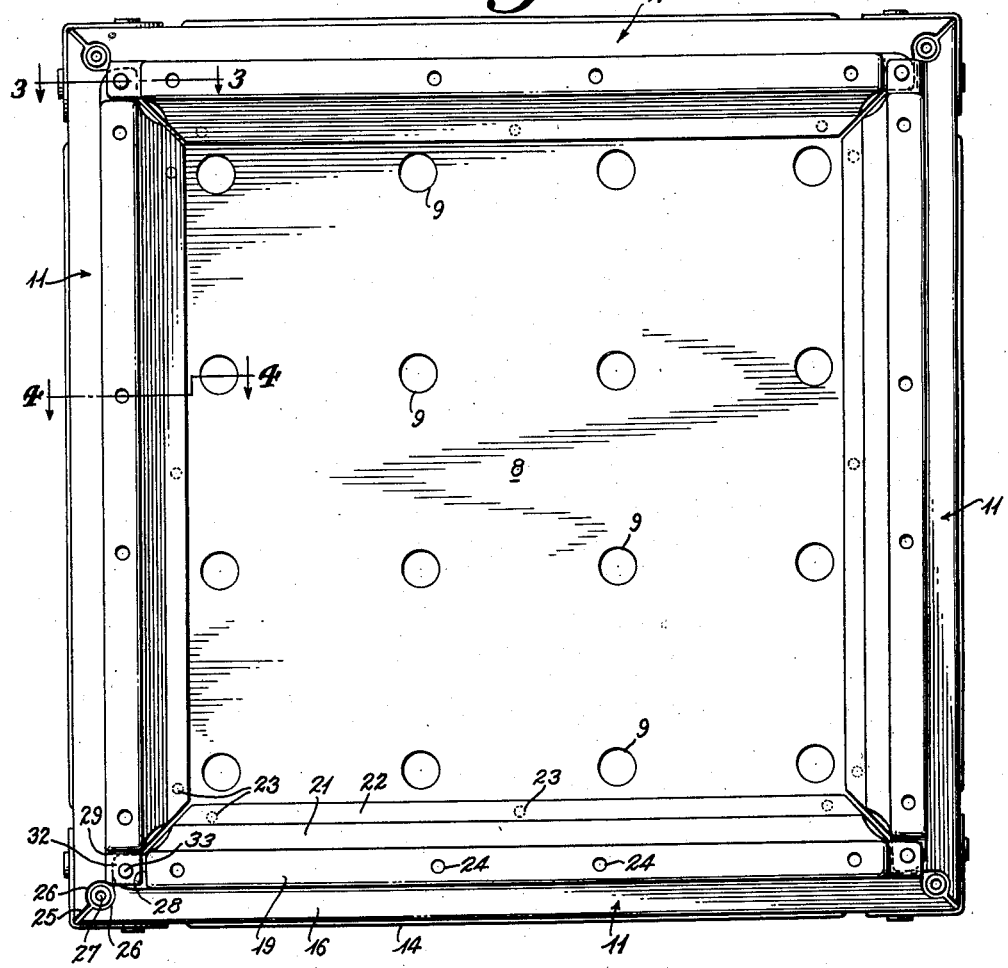
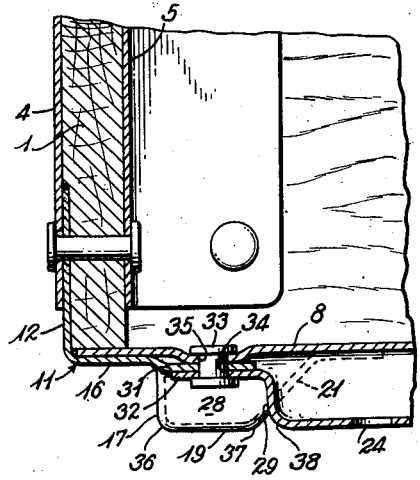
INVENTOR.
HOUSTON REHRIG
BY
ATTORNEYS Sept. 2, 1958　　　　　H. REHRIG　　　　　2,850,204
MILK CRATE
Filed Sept. 28, 1954　　　　　　　　　　　3 Sheets-Sheet 2
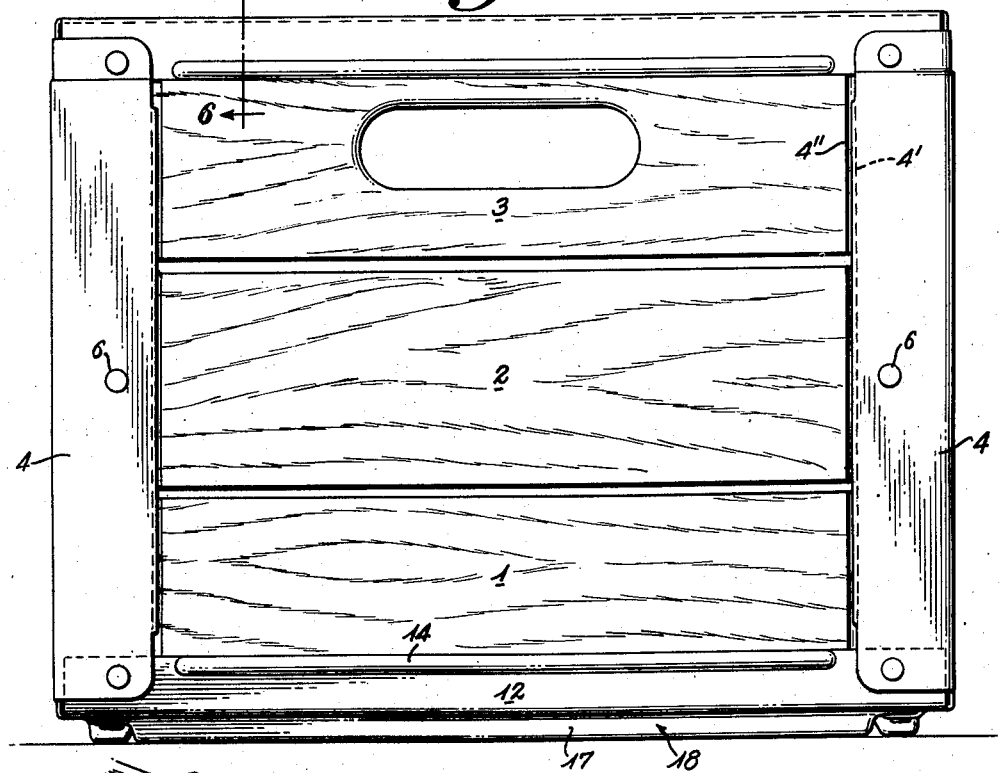
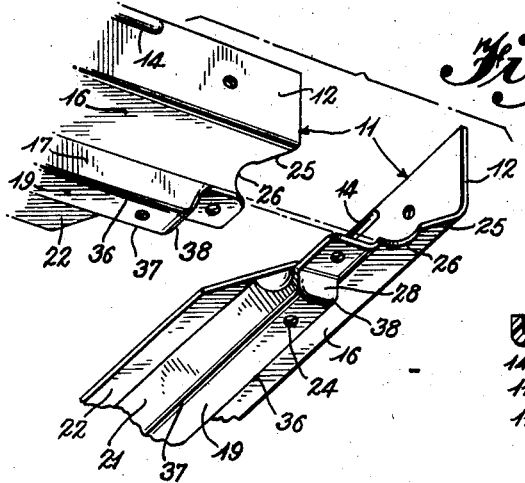
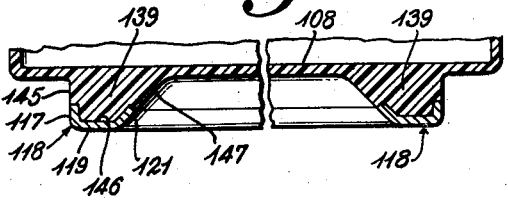
INVENTOR.
HOUSTON REHRIG
BY
ATTORNEYS Sept. 2, 1958 H. REHRIG 2,850,204
MILK CRATE
Filed Sept. 28, 1954 3 Sheets-Sheet 3
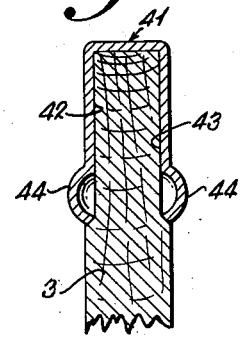
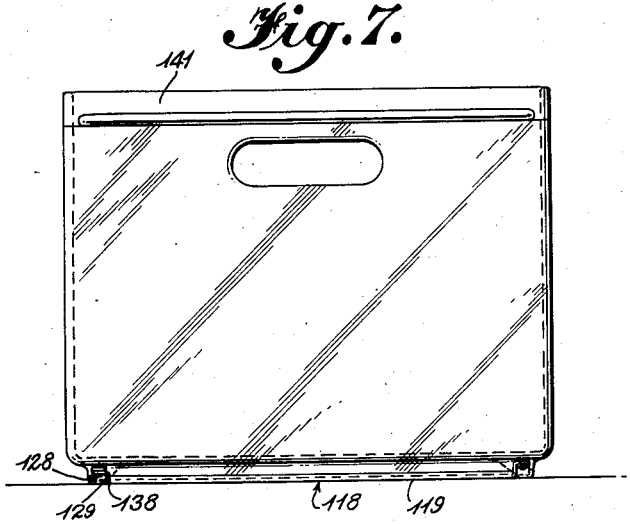
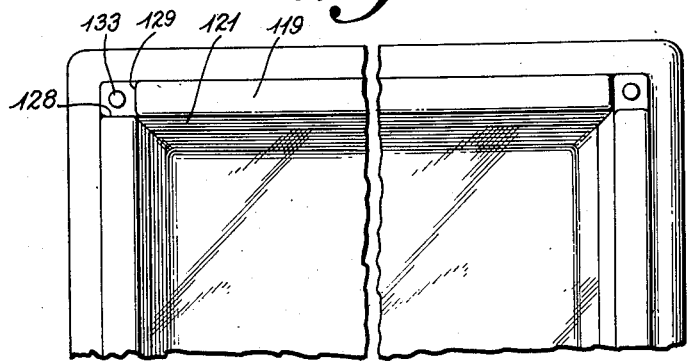
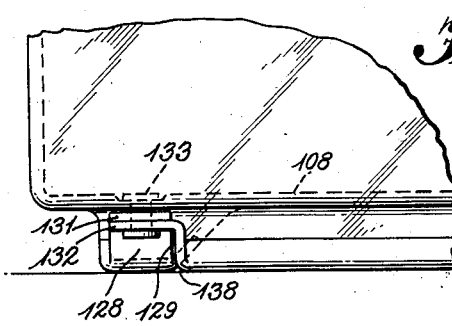
INVENTOR
HOUSTON REHRIG
BY Mead, Browne, Schuyler & Beveridge
ATTORNEYS

United States Patent Office 2,850,204
Patented Sept. 2, 1958

2,850,204

MILK CRATE

Houston Rehrig, Los Angeles, Calif., assignor to Rehrig-Pacific Company, Los Angeles, Calif., a corporation of California Application September 28, 1954, Serial No. 458,808

12 Claims. (Cl. 220—97)

This invention relates to milk crates and particularly concerns milk crates for cardboard milk containers.

Unlike milk bottles, cardboard milk cartons are subject to punctures and may be easily crushed. Milk crates currently in use present many sharp edges and points which frequently puncture cartons. Particularly when slightly damaged, present day milk crates have metal parts which become bent or otherwise deformed to represent a serious hazard to the milk cartons. Sharp edges and points on the milk crates may, with a light blow in handling the crates or the milk cartons, cut or puncture the cartons and thereby render them unsalable.

This invention concerns an improved milk crate for reducing the hazards in handling the milk cartons by eliminating sharp edges, corners and points in new crates and minimizing the likelihood of such edges, corners or points being formed when a crate is slightly damaged or subjected to damaging forces in normal handling.

It is therefore a major object of this invention to provide a milk crate which presents a minimum of sharp edges and points and is reinforced to resist deformation in a manner tending to form such sharp edges or points.

Another object of this invention is to provide a milk crate in which the stacking rails are free of sharp edges and points and are arranged to facilitate stacking of the crates as well as afford better cooperation with conveyor pusher elements used in handling the crates.

In the attainment of these objects one important feature of the invention resides in the construction of stacking rails on the bottom of the milk crate with each rail terminating in a squared end forming a recess at the intersection of the ends and eliminating the sharp corner formed by stacking rails heretofore in use. Preferably these stacking rails have the edge at the intersection of the bottom surface with each end surface, substantially aligned with the edge on contiguous rails formed by the bottom surface and the inner side surface thereof. In this way the stacking rails present an uninterrupted inner edge forming a substantially square sliding surface to prevent catching of the ends of the rails when the case is stacked upon another case below.

Another feature of the invention resides in the provision of stacking rails which may be riveted together and to the bottom of the crate at each corner, thereby facilitating repair and replacement of the stacking rails. All of the stacking rails have rounded edges and corners to eliminate the likelihood of damage to milk cartons with which the cases may come in contact.

To minimize damage during movement of the crates on conveyors and provide for engagement of conveyor pusher elements solely with the rail on the trailing side of a case, the inner side surface of each stacking rail is disposed at an obtuse angle with respect to the bottom surface of the rail, and thereby forms a sloping surface, inclined upwardly and inwardly, which will slide over and disengage itself from a conveyor pusher element so the trailing side of a milk crate and the stacking rail on the bottom of such trailing side will be engaged by a succeeding conveyor pusher element.

These stacking rails may be formed on bottom edge elements of the milk crate having side flanges overlying the bottom margin of the side wall and bottom portions extending from the side across the edge margin of the bottom. The rails extend along the inner edge of the bottom portion and have bottom surfaces with inner and outer side surfaces extending from the bottom surface to the bottom of the crate. It has been found desirable to have a fastening tab extending outwardly from the end of each rail with one end disposed slightly higher than the other end so it overlies the corresponding tab on a contiguous rail. Except for these overlying tabs the ends of the rail assemblies may be mitered with provision for a drainage hole in the outer corner of the rail aligned with a countersunk hole in the corner of the bottom of the milk crate to insure the drainage of water from the corner areas.

To reduce the likelihood of deformation of the top and bottom side members of the milk crate when subjected to severe blows in handling, the edges of these elements are provided with a longitudinally extending rounded rib which reinforces the member along the vulnerable edge portions and prevents the formation of sharp points or edges when the crate is subjected to blows or other damaging forces. In this way the life of the crate is greatly prolonged because the formation of a sharp point in one of the elements of the crate may render the crate so likely to damage a cardboard milk carton that the crate is rendered useless. These rounded ribs reduce the damage to the crate in this fashion.

Other objects and advantages and features of the invention will become apparent from the following specification taken in conjunction with the accompanying drawings in which:

Fig. 1 is a bottom view of my improved milk crate;

Fig. 2 is a side elevation of the crate in Fig. 1;

Fig. 3 is an enlarged sectional view of a corner of the crate taken on line 3—3 of Fig. 1;

Fig. 4 is an enlarged sectional view of the stacking rail taken on line 4—4 of Fig. 1;

Fig. 5 is an exploded perspective view showing the details of the corner assembly of the stacking rails;

Fig. 6 is an enlarged sectional view showing the reinforcing guard at the top edge of a crate taken on the line 6—6 of Fig. 2;

Fig. 7 is a side elevation of a milk crate of monolithic plastic construction provided with stacking rails and reinforcing guards embodying the invention;

Fig. 8 is a fragmentary bottom view of the crate of Fig. 7;

Fig. 9 is a partial cross sectional view of the plastic milk crate shown in Fig. 7; and Fig. 10 is a side view of the plastic crate showing the details of the stacking rail end connections.

In the embodiment shown in Fig. 1, the milk crate has a metal bottom with wooden sides and metal corners and tops. Each side has a lower side board 1, an intermediate side board 2 and an upper side board 3 held in assembled condition by outer and inner corner angle members 4 and 5 between which the side boards are secured as by rivets 6. If desired, the ends of the side boards may be recessed as at 7 to receive the inner corner member 5 so the surfaces of the corner members are substantially flush with the inner surfaces of the side boards. Flanges 4' on the edges of outer corner member 4 lie in grooves 4" formed in the side boards to reinforce the corner members and also minimize exposure of the sharp edges of the members.

The metal bottom of the crate includes a metal sheet 8 which extends over the entire bottom of the crate and beneath the edges of lower side boards 1. This bottom sheet may be provided with a plurality of drainage holes 9 dispersed throughout the area of the bottom. Around the entire bottom periphery of the crate is a stacking rail assembly which consists of four identical bottom edge elements designated generally by the reference numeral 11.

As best seen in Fig. 4, each of the bottom edge elements 11 has a vertical side flange 12 lying in a recess 13 in lower side board 1. This flange 12 also underlies the corner members 4 so one of the rivets 6 passes through flange 12 to secure the bottom edge elements 6 to the side walls of the crate. Along the upper edge of flange 12 between the corner members there is formed a longitudinally extending reinforcing rib 14 having a substantially semi-circular cross section. Recess 13 in the lower side board 1 of the crate is of such depth that rib 14 is substantially flush with upper edge 15 of recess 13.

Each bottom edge element 11 has a bottom portion 16 extending at a right angle from side flange 12 and underlying the side wall of the crate as well as the margin of bottom sheet 8. Depending from bottom portion 16 is a vertical wall 17 of a stacking rail 18 having a bottom wall 19 and an inwardly and upwardly inclined inner wall 21 terminating in a flange 22 underlying the bottom sheet 8 and secured thereto as by spot welding at 23. Vertical wall 17 of the stacking rail lies in a vertical plane spaced inwardly of and parallel to the crate side to fit within a similar crate when the milk crates are stacked one upon another.

Vertical wall 17 of the stacking rail 18 also provides an abutment for pusher elements of conveyors which are used to convey the milk crates during handling operations. It is desirable that the pusher elements engage the vertical wall 17 rather than inner wall 21 because crates have a greater resistance to forces applied to outer parts since such forces are more uniformly distributed than forces applied to inner elements of the crates. Inner side wall 21 of the stacking rail is disposed at an obtuse angle to the bottom 4 of the crate so conveyor pusher elements slide beneath the sloping side wall 21 and the stacking rails so the vertical wall 17 of the stacking rail at the trailing side of the crate will be engaged by a succeeding pusher element on the conveyor. This insures that the force which transfers the crate along the conveyor will always be applied to an outer side surface of vertical wall 17 on the stacking rails and thereby push side flange 12 against instead of away from the side of the crate. Drainage holes 24 may be provided in the bottom wall 19 of the stacking rail to prevent the accumulation of liquid inside the stacking rail.

An important feature of my invention resides in the manner in which the ends of the stacking rails 18 are formed. Side flange 12 of the bottom edge element 11 extends across the entire side of the crate from corner to corner. The ends of bottom portion 16 are mitered as at 25 so the rails abut each other in this region. The mitered ends 25 of bottom portions 16 have a semi-circular cutout portion 26 forming a drainage hole at each corner of the crate vertically aligned with a corresponding drainage hole 27 countersunk in each corner of bottom sheet 8. End walls 28 and 29 close the ends of each stacking rail 18. Extending outwardly from the end walls 28 and 29 are mounting flanges or tabs 31 and 32. Mounting tabs 31 and 32 are slightly offset so they overlap each other. The bottom edge elements 11 are secured to one another and to the bottom sheet 8 by rivets 33 extending through the overlapping holes 34 in mounting tabs 31 and 32 and through holes 35 in bottom sheet 8. As has been previously stated, each bottom edge element 6 is identical so these elements may be manufactured in quantity and easily assembled without selecting particular elements for a particular location on the crate.

Outer side edges 36, inner side edges 37, and end edges 38 on the stacking rails are all rounded to eliminate sharp places which may damage cartons. When assembled, end edge 38 on each stacking rail is substantially aligned with the inner edge 37 on a contiguous stacking rail so the rails present an uninterrupted sliding surface which will not catch or hang on other crates when being stacked or on conveyors or surfaces along which the crates may be moved.

End walls 28 and 29 on contiguous stacking rails form interior angles at the juncture of the stacking rails which are less hazardous than the sharp exterior angles on crates heretofore used. Squared ends formed by end walls 28 and 29 on the stacking rails are less likely to be damaged than pointed corners and will take more punishment than rails heretofore used. Mitered corners of the bottom portions 16 are made possible by location of rivets 33 within the interior angles of end walls 28 and 29 and these mitered corners afford a relatively smooth surface at the bottom corners of the crate. Greater strength is also afforded by the location of rivets 33 at each end of the stacking rails.

With this arrangement of stacking rails, drainage holes 27 may be located in each corner of the bottom of the crate to insure removal of any accumulated liquid and facilitate cleaning of the crates.

In order to protect and reinforce the top edges of the crate from the rough usage occasioned in stacking crates one upon each other, I have provided a metal guard 41 positioned over the top edge of the crate. As seen in Fig. 6, the guard 41 is of essentially U-shaped cross section and extends downwardly of the side wall of the crate in recesses 42 and 43 formed in both the inner and outer side surfaces of upper boards 3. Reinforcing ribs 44 of semi-circular section are formed on the lower edges of the guard 41 to resist deformation of these edges and particularly avoid damage to the crate which may produce a sharp point on the guard. In the absence of a reinforcing rib, such as 44, the edge of the guard tends to form a sharp projection when the guard is dented. By providing my guard 41 with the ribs 44, such sharp projections are eliminated and the danger of puncturing cardboard milk cartons on such projections is absent in my improved milk crate. Like reinforcing rib 14 on side flange 12 of the stacking members, the reinforcing ribs 41 terminate short of the ends of the guard to provide flat areas underlying the respective outer and inner corner members 4 and 5.

While crates with wood side walls have proven quite satisfactory in service both from the standpoint of strength and economy, stronger and lighter milk crates may be molded of plastic material, as shown in Figs. 7–10 of the drawings. My improved stacking rails may be advantageously employed in a plastic crate of this type.

To accommodate the stacking rails, projections 139 may be formed on the bottom wall 108 of the crate during the molding operation. Projections 139 extend along each side of the bottom, spaced inwardly from the edges, and are formed with a vertical outer side surface 145, a horizontal bottom surface 146 and an inclined inner side surface 147. Preferably, the lower portions of outer side surface 145 and inner side surface 147 are relieved to accommodate the stacking rails 118 so the exposed inner and outer surfaces 121 and 117 of stacking rails 118 are substantially flush with surfaces 145 and 147 of projections 139.

Like the ends of the stacking rails 18 heretofore described, stacking rails 118 for the plastic crate have end walls 128 and 129 forming an interior right angle at the ends of the rails. Rounded end edges 138 formed at the intersection of the end walls 128, 129 and the bottom walls 119 of the rails are substantially aligned with rounded inner side edges formed at the intersection of the inner side walls 121 and the bottom walls 119 of a contiguous rail. This affords complete protection for the molded plastic projection 139 on the bottom of the crate and provides strong rails with easy sliding surfaces as in the case of the rails on wooden crates.

These protective stacking rails may be secured to the crate by tabs 131 and 132 extending from the end walls at each end of the rails. With the tabs on each rail vertically offset to only each other, rivets 133 passing through the tabs and the bottom 108 of the crate secure the rails.

If desired, upper edges of the molded plastic milk crate may be protected by guards 41 similar to the guards 41 used on wooden crates.

It will be recognized that my invention is capable of modification. The foregoing description is therefore to be considered as exemplary rather than limiting and the true scope of my invention is defined in the following claims.

I claim:

1. A milk crate comprising a rectangular bottom, side walls extending upwardly from each side of said bottom, stacking rails on said bottom extending along each side thereof, each of said stacking rails having at least one surface thereof in abutment with corresponding surfaces on contiguous stacking rails, end walls on each end of each rail extending from the bottom of the rail to the bottom of the crate and forming an interior angle at each corner, fastening tabs extending from each of said end walls, the tabs at contiguous ends of each rail being disposed in overlying relation within the interior angle formed by the respective end walls, and rivets passing through each of said tabs and said bottom securing each end of each rail to said bottom.

2. In a milk crate having a rectangular bottom, side walls extending upwardly from each side of said bottom, a stacking rail assembly including a plurality of stacking rails extending around said bottom and spaced from the edges thereof, each of said stacking rails comprising a bottom surface, inner and outer side surfaces extending from said bottom surface toward the bottom of the crate, and end surfaces perpendicular to said bottom surface and said outer side surface extending from said bottom surface to the bottom of the crate between the inner and outer surfaces of the respective rails at the inner side surfaces of contiguous rails to define an interior angle on the outer peripheral surface of said rail assembly at each corner of said crate, and means located within said interior angle for securing said rail assembly to the bottom of said crate.

3. In a milk crate as recited in claim 2 wherein said inner side surfaces are inclined inwardly from the bottoms thereof toward the bottom of the crate to provide inwardly sloping inner surfaces on the inner sides of said rails.

4. A milk crate comprising a rectangular bottom, side walls extending upwardly from each side of said bottom, stacking rails on said bottom extending along each side thereof, inner and outer side surfaces of said rails respectively extending from the inner and outer edges of the bottom surface thereof to the bottom of the crate, the inner surface of each of said rails being inclined inwardly toward the bottom of the crate, end walls on each end of each rail extending from the bottom surfaces thereof to the bottom of the crate to define an interior angle to each corner of the bottom of the crate, and fastening means extending from said end walls into said interior angles for securing said stacking rails to the bottom of said crate.

5. A milk crate comprising a rectangular bottom, side walls extending upwardly from each side of said bottom, and bottom edge elements extending along each side edge of said bottom, each of said bottom edge elements comprising a bottom portion extending inwardly from the side edge of the bottom and having mitered ends cooperating with corresponding mitered ends on contiguous bottom edge elements to form a flat surface in each corner of the bottom, a stacking rail extending along said bottom portion spaced inwardly from the side edge of the bottom of the crate, end walls on each end of said rail arranged to form with the corresponding end wall of contiguous rails an interior angle at each corner of the bottom of the rails an interior angle at each end of said rail extending crate, a fastening tab at each end wall, the fastening tabs on contiguous bottom edge elements being arranged in overlying relation in the interior angle formed by the end walls of contiguous rails, and fastening means extending through the overlying tabs and said bottom to secure said bottom edge elements to the bottom of the crate.

6. A milk crate as defined in claim 5 wherein the bottom of the crate at each corner is formed with a drainage hole cooperating with corresponding openings in the mitered edges of the bottom edge elements to provide drainage openings at each corner of the crate.

7. A milk crate, a rectangular bottom panel of plastic material, integral projections of the plastic material depending from said panel along each side thereof, end walls extending from the bottoms of said projections to said bottom panel at each end of each projection, the end walls of adjacent projections forming an interior angle at each corner of said bottom panel, and a metallic stacking rail overlying each of said projections and secured to said bottom panel within said interior angle.

8. In a crate including a rectangular bottom and side walls extending upwardly from each side of said bottom; a stacking rail assembly mounted upon said bottom, said assembly comprising a plurality of similar stacking rails, one rail extending along each side of the bottom, each of said rails including an outer side wall, a bottom wall and an inner side wall, the inner side walls of contiguous rails being in endwise abutment with each other to define a continuous inner peripheral surface on said stacking rail assembly, an end wall at each end of said bottom wall projecting upwardly therefrom, a fastening tab on each of said end walls projecting horizontally outwardly from the upper end thereof, the fastening tab at one end of each rail being located in underlying abutment with the bottom of said crate and the fastening tab at the other end of each rail being located in underlying abutment with the fastening tab at said one end of a contiguous stacking rail, adjacent end walls on contiguous rails defining an interior angle on the outer periphery of said stacking rail assembly at each corner thereof and fastening means securing the tabs on contiguous rails to said bottom.

9. A milk crate comprising a rectangular bottom, side walls extending upwardly from each side of said bottom, bottom edge elements along each side of said bottom, each of said bottom edge elements comprising a side flange extending along the bottom of the side walls, a bottom portion extending inwardly from said side flange in overlying relation with the marginal edge of the bottom, a stacking rail spaced inwardly from the side edge of the bottom and projecting downwardly along the inner edge of the bottom portion, a fastening tab comprising a horizontal plate-like portion extending from each end of said rail beyond the plane defined by the ends of opposite side surfaces of the stacking rail into the outwardly facing interior angle formed between the planes defined by the ends of the side surfaces of the stacking rails, each fastening tab stacking rail overlapping corresponding tabs on contiguous rails and secured to said rectangular bottom, and mitered edges on each end of the bottom portions extending from said tabs to the corner of the bottom to abut with corresponding mitered edges on contiguous elements and form a continuous flat surface in the corner of the bottom.

10. A milk crate comprising a rectangular bottom, side walls extending upwardly from each side of said bottom, and bottom edge elements along each side edge of the bottom, each of said bottom edge elements comprising a side flange overlying the bottom of the side along the bottom edge thereof, the bottom portion extending from said side flange inwardly in overlying relation with the margin of said bottom, a stacking rail extending along the inner edge of said bottom portion and spaced inwardly from the side of the bottom, a vertical end wall surface extending from the rail bottom to the crate bottom between opposed sides of the rails at each end of said rail located to define with corresponding end walls on rails of contiguous bottom edge elements, an outwardly facing interior angle at each corner of the bottom of the crate, fastening tabs extending from both end walls of the stacking rails outwardly into the interior angle formed between the end walls on contiguous side wall elements secured to the bottom of the crate with corresponding tabs on contiguous bottom edge elements arranged to lie in overlapping relation, and mitered edges on each end of said portion abutting with corresponding mitered edges on contiguous bottom portions to form a continuous flat surface from said tabs to the corner of the bottom of the crate.

11. A milk crate as defined in claim 10 wherein drainage openings are formed in the bottom of the crate and in the bottom portion of the bottom edge elements at each corner of the crate.

12. In a crate including a rectangular bottom and side walls extending upwardly from each side of said bottom; a stacking rail assembly mounted upon said bottom, said assembly comprising a plurality of similar stacking rails, one rail extending along each side of said bottom, each of said rails including an outer side wall, a bottom wall and an inner side wall, the inner side walls of contiguous rails being in endwise abutment with each other to define a contiguous inner peripheral surface on said stacking rail assembly, and end walls at each end of said bottom walls projecting upwardly therefrom to the bottom of said crate, adjacent end walls on contiguous rails defining an interior angle at each corner of the outer peripheral surface of said stacking rail assembly, fastening tabs projecting from the upper ends of said end walls, the tabs at contiguous ends of each rail being located in overlying abutting relation to each other within said interior angle with the uppermost tab in abutment with said bottom, and means for securing said tabs to said bottom.

References Cited in the file of this patent
UNITED STATES PATENTS

| | | |
|---|---|---|
| 1,487,118 | Miller | Mar. 18, 1924 |
| 1,873,720 | Piker | Aug. 23, 1932 |
| 1,987,764 | Walker et al. | Jan. 15, 1935 |
| 2,026,901 | Leake et al. | Jan. 7, 1936 |
| 2,216,417 | McKenney | Oct. 1, 1940 |
| 2,262,642 | Liberson | Nov. 11, 1941 |
| 2,464,343 | Praeger et al. | Mar. 15, 1949 |
| 2,496,965 | Swingle | Feb. 7, 1950 |
| 2,541,846 | Ullrich et al. | Feb. 13, 1951 |
| 2,592,797 | Erickson | Apr. 15, 1952 |
| 2,655,283 | Moldt | Oct. 13, 1953 |
| 2,695,115 | Roop | Nov. 23, 1954 |
| 2,758,742 | Farrell | Aug. 14, 1956 |